United States Patent

Wilt

[15] 3,668,162
[45] June 6, 1972

[54] TREATING POLYBUTADIENE

[72] Inventor: Mason S. Wilt, Borger, Tex.
[73] Assignee: Phillips Petroleium Company
[22] Filed: Nov. 25, 1968
[21] Appl. No.: 778,855

[52] U.S. Cl. .............................260/27, 260/33.6, 260/45.95, 260/94.3, 260/94.7
[51] Int. Cl. ..........................................................C08d 9/12
[58] Field of Search ..................260/27, 94.2 M, 84.1, 45.95, 260/33.6

[56] References Cited

UNITED STATES PATENTS

| | | | |
|---|---|---|---|
| 2,506,857 | 5/1950 | Crouch | 260/94.2 |
| 2,546,244 | 3/1951 | Tucker | 260/84.1 |
| 3,178,402 | 4/1965 | Smith et al. | 260/94.2 |
| 3,182,050 | 5/1965 | Irvin | 260/94.2 |
| 3,318,862 | 5/1967 | Hinton | 260/94.2 |
| 3,350,380 | 10/1967 | Strobel | 260/94.2 |
| 3,400,091 | 9/1968 | Stumpe | 260/27 |

*Primary Examiner*—Hosea E. Taylor
*Assistant Examiner*—William E. Parker
*Attorney*—Young and Quigg

[57] ABSTRACT

Polybutadienes are treated with titanium tetrachloride and molecular oxygen to form modified polybutadiene products having substantially higher Mooney viscosities, characterized by a reduced tendency to cold flow.

14 Claims, No Drawings

TREATING POLYBUTADIENE

This invention relates to a method of treating certain polybutadienes to improve their physical properties. In one aspect it relates to a method for treating a polybutadiene with certain catalysts, also here referred to as molecular weight jumping agents, to induce a high degree of branching as shown by a substantial Mooney increase and a corresponding cold flow decrease.

The manufacture of polybutadiene by emulsion, mass and solution polymerization of butadiene is well known. For example, considerable work on the preparation of emulsion polymerized and sodium catalyzed mass polymerized butadiene is described in *Synthetic Rubber* by Whitby (John Wiley and Sons, Inc., New York, N.Y., 1954). A recipe for one such emulsion polymerized material (BR—2104) is given in ASTM D 1420—60T. However, the properties and processibility of these polybutadienes leave something to be desired.

In the past few years considerable research work has been directed toward the production of high-cis polybutadiene since this rubbery polymer exhibits physical properties which are particularly attractive for the fabrication of automobile and truck tires and other articles for which conventional synthetic polymers have previously been generally unsuccessful. In particular, high-cis polybutadiene can be extended with more carbon black and oil, without deteriorating, than can conventional polybutadiene or styrene-butadiene rubbers. These extenders not only lower the per pound cost of the products formed (e.g., tires) but also improve strength and abrasion resistance. For instance, carbon black can increase the road life of a tire as much as 10 times. However certain processing and manufacturing difficulties have been encountered in the industry because of the tendency of this rubbery polymer to cold flow while in the unvulcanized state. To illustrate, if the containers used to store or package these polymers develop cracks or are punctured, the unvulcanized polymer will often flow through these openings, resulting in product loss or contamination and the possibility that these containers will become stuck together.

Therefore it is the object of this invention to provide a method for eliminating or substantially reducing the tendency of polybutadiene to cold flow in the unvulcanized state.

Another object of this invention is to provide a method for terminating the polymerization reaction in which polybutadiene is produced so as to obtain a polymer product which has a reduced tendency to cold flow.

Other objects, advantages and features of this invention will be apparent to those skilled in the art upon consideration of the accompanying disclosure.

Molecular weight jumping is a well-known process for reducing cold flow and improving handling and compounding of polybutadiene (e.g., British Pat. No. 992,210, "Treatment of Rubbery Polymers"). The use of titanium tetrachloride as a catalyst in the polymerization of butadiene and in the molecular weight jumping of polybutadiene is also well known. (The term "molecular weight jumping" was coined by Chemische Werke Huls, of Marl, West Germany, to describe its technique for increasing the molecular weight of a polymer in solution from two to 10 times by adding a cocatalyst that ties together large molecules.) But what was not known previously and what is now revealed by the applicant is that an unexpected improvement in molecular weight jumping of polybutadiene results if a cocatalyst system of oxygen and titanium tetrachloride is used. The process of this invention is applicable to unquenched (not containing shortstopping or stabilizing agents) polybutadiene made by any process known to the industry, such as those described in U.S. Pat. Nos. 2,506,857; 2,546,244; and 3,178,402, the most important of these polybutadienes are the ones having relatively high cis-1,4 configurations. The microstructure of those polybutadienes in which the cis-1,4 configuration is present can vary considerably, but generally the preferred range is between 50 and 100 percent cis-1,4 addition, with the optimum cis-1,4 content being at least 85 percent.

A suitable method for determining the percentage of the polymer in the cis-1,4 configuration is through infrared analysis.

In this method polymers are dissolved in carbon disulfide to form a solution having 20 grams of polymer per liter of solution. The infrared spectrum of each of the solutions (percent transmission) is then determined in a commercial infrared spectrometer.

The percent of the total unsaturation present as trans-1,4 is calculated according to the following equation and consistent units:

$$\epsilon = E/(tc)$$

where $\epsilon$ = extinction coefficient (liter-mols$^{-1}$-microns$^{-1}$); $E$ = extinction (log Io/I); $t$ = path length (microns); and $c$ = concentration (mols double bond/liter).

The extinction is determined at the 10.35 micron band and the extinction coefficient used is $1.21 \times 10^{-2}$ (liters-moles$^{-1}$-microns$^{-1}$).

The percent of the total unsaturation present as 1,2-(or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis-1,4 is then obtained by subtracting the trans-1,4 and 1,2-(vinyl) determined according to the above methods from the theoretical unsaturation assuming one double bond per each $C_4$ unit in the polymer.

After the polymerization of the butadiene by one of the known processes has been completed, the molecular weight jumping process can be initiated in a solution or highly dispersed mixture of the polybutadiene in a liquid hydrocarbon reaction medium. This reaction solvent or diluent must not be deleterious to the catalyst system. Examples of suitable reaction media include aromatic, paraffinic, and cycloparaffinic hydrocarbons, it being understood that mixtures of these materials may also be used. Specific examples include benzene, toluene, n-butane, isobutane, n-pentane, isooctane, n-dodecane, cyclopentane, cyclohexane, methylcyclohexane, and the like. Mixtures of any of these hydrocarbons can also be used. The preferred solvent is toluene. Depending on the molecular weight jump desired, 0.05 to 1.5 phr (parts per 100 parts by weight rubber) of $TiCl_4$ is used, together with 0.1 to 20 millimoles of oxygen (as such or in air) per 100 parts by weight of rubber, with the preferred range of $TiCl_4$ being 0.3 to 0.75 phr and the corresponding preferred range of oxygen being 0.4 to 5.0 millimoles phr. Of course the term "rubber" used above is synonymous with the term "polymer." The weight unit associated with the millimoles of oxygen will always correspond to the weight unit of the rubber. Thus if the parts by weight of rubber are pounds, the amount of oxygen added will be in pound millimoles. The amount of catalysts (molecular weight jumping agents) added is also influenced by other factors in addition to the extent of "jump" desired. These factors include (1) the contact or reaction time between the agents and the polymer in solution; (2) the initial Mooney viscosity of the polymer, since the formation of a gel in the polymer at high viscosity levels is quite common and is to be avoided; and (3) the temperature of the polymer solution.

While temperature and pressure can affect the speed of the molecular weight jump, they are generally not critical. Yet for best results it is desirable that the process temperatures range from 50°–200° F at pressures sufficient to maintain the polymer solution substantially in the liquid state. For convenience it is often best to conduct the jumping process at or near the temperature at which the polymer was produced.

It is within the scope of this invention that the cocatalysts can be added individually in any desired order or can be simultaneously introduced.

Although the reaction time between the polymer and the titanium tetrachloride can be relatively short (less than 1 minute) when the titanium tetrachloride is introduced first, it is desirable that the two ingredients remain in contact under continual agitation for at least 15 minutes before the oxygen is added to ensure optimum results. This contact can be continued for as long as several hours, but the molecular weight jump is not noticeably higher than that achieved after only a 15 minute contact.

If the oxygen is introduced prior to the titanium tetrachloride addition, it is desirable that the titanium tetrachloride not be added until at least 2 minutes after the addition of the oxygen has been completed.

The oxygen can be introduced in any convenient manner; preferably it is slowly bubbled through the polymer solution under slight pressure. The oxygen can be added as undiluted molecular oxygen, as air, or it can be introduced in a mixture with inert gases such as nitrogen. For example, sufficient quantities of air can be bubbled through the polymer solution, thus satisfying the molar oxygen requirement.

After the molecular weight jumping reaction has substantially proceeded to completion (regardless of the order in which the catalysts are introduced, a total reaction time of at least 17 minutes should be allowed—15 minutes for the titanium tetrachloride and 2 minutes for the oxygen), the active nature of the catalysts is destroyed by the addition of a short-stopping agent. As an optional feature of this process, an antioxidant or stabilizing agent can also be added which gives the polymer improved handling and compounding features. The shortstopping and the stabilizing agent can each be added and mixed into the reaction mixture generally in an amount of from 0.1 to 10.0 phr. Any of the shortstopping agents known in the industry can be used. Two of the more commonly used agents are disproportionated rosins and mixed fatty acids. Also, there are several suitable stabilizing agents, of which 2,2'-methylenebis(4-methyl-6-tert-butylphenol) and 2,6-di-tert-butyl-4-methylphenol are two of the possible ones which can be employed.

The process of the invention is carried out on a substantially gel-free rubbery polymer of butadiene having a Mooney viscosity in the range of about 5 to 100. The upper limit of the Mooney viscosity is not critical, although it is practically defined by the substantial absence of gel. For example, a polymer of butadiene having a Mooney viscosity above 100 can be used in accordance with the process of the invention, although it is difficult to go much above the level without producing significant amounts of gel. The preferred range of Mooney viscosity is between 20 and 75.

The polymer after being treated according to this process will show a Mooney rise which, depending on conditions, can be as low as 10 points to as high as 100 plus points, although the formation of gel can become a problem at the very high Mooney increases.

Mooney viscosities (ML—4 at 212° F) referred to are described in ASTM—D 1646—63. This term and the method of designating viscosity values of rubbery polymers are universally used and understood throughout the rubber industry.

A more comprehensive understanding of this invention can be attained through the following illustrative example which, however, is not intended to limit the scope of the invention:

EXAMPLE

To demonstrate the process of this invention, polybutadiene having cis-1,4 content in excess of 90 percent was prepared using the following recipe:

| | Parts by Weight |
|---|---|
| Toluene | 1200 |
| Butadiene | 100 |
| Triethylaluminum (TEA) | 0.437 |
| Iodine | 9.19 |
| Titanium tetrachloride | 0.085 |

The charge order was (1) toluene, (2) butadiene, cool to 40° F, (3) TEA, stir 5 minutes, and (4) mixed $I_2$ and $TiCl_4$.

Reaction was carried out for 25.5 hours at 40° F, at which time the conversion was 78 percent. The reactor contents were warmed to 70° F and split into four parts:

Part 1. (Control) — 2 phr of a disproportionated rosin and 0.5 phr of 2,2'-methylene bis(4-methyl-6-tert-butylphenol) were added.

Part 2. Air containing 1.8 mmoles of oxygen was added, and after 2 minutes reaction, the same amount of disproportionated rosin and 2,2'-methylene bis (4-methyl-6-tert-butylphenol) were added.

Part 3. 0.56 phr of $TiCl_4$ was added, the mixture was agitated for 15 minutes, and the same amount of disproportionated rosin and 2,2'-methylene bis(4-methyl-6-tert-butylphenol) were added.

Part 4. 0.56 phr of $TiCl_4$ was added, the mixture was agitated for 15 minutes, air containing 1.8 mmoles of oxygen was added, and after 2 minutes reaction time, the same amount of disproportionated rosin and 2,2'-methylene bis(4-methyl-6-tert-butylphenol) were added.

All samples were recovered by steam stripping and mill drying, and Mooney viscosities (ASTM—D 1646—63, ML—4, 212° F) were determined:

| Part No. | $O_2$ | $TiCl_4$ | Mooney Viscosity | Mooney Jump |
|---|---|---|---|---|
| 1 (Control) | No | No | 37 | — |
| 2 | Yes | No | 37 | 0 |
| 3 | No | Yes | 43 | 6 |
| 4 | Yes | Yes | 108 | 71 |

It is evident from this example that the combination of $TiCl_4$ and oxygen produces a Mooney jump which is unexpected and significantly greater than would have been predictable from the results of Parts 2 and 3 of this example. The resultant product has a much greater resistance to cold flow and therefore can be safely stored in the unvulcanized state.

This preceding example was performed in a batch operation; yet this inventive process is not limited to batch treatments, but is also applicable to continuous process treatments.

As will be evident to those skilled in the art, many variations and modifications of the invention can be practiced in view of the foregoing disclosure without departing from the spirit and scope of the invention.

I claim:

1. A process for reducing the tendency of a polybutadiene having at least 50 percent of the butadiene units in the 1,4-configuration to cold flow when in the unvulcanized state which comprises contacting unquenched polybutadiene in a liquid hydrocarbon reaction medium selected from the group consisting of paraffinic hydrocarbons having from four to 10 carbon atoms, cyclopentane, cyclohexane, methylcyclohexane, benzene, toluene and mixtures thereof with titanium tetrachloride and molecular oxygen and recovering polybutadiene product having a reduced tendency to cold flow, said product having a Mooney viscosity which is in the range of about 10 to about 100 Mooney points higher than that of the unquenched polybutadiene, the Mooney viscosity ML—4 at 212° F being determined as described in ASTM D—1646—63.

2. A process according to claim 1 wherein the unquenched polybutadiene is highly dispersed in the liquid hydrocarbon.

3. A process according to claim 1 wherein the unquenched polybutadiene is dissolved in the liquid hydrocarbon.

4. A process according to claim 1 wherein the Mooney viscosity of said unquenched polybutadiene is in the range of 5-100 (ML—4 at 212° F).

5. A process according to claim 1 wherein a shortstopping agent to destroy the active nature of the catalysts is added to said unquenched polybutadiene in a liquid hydrocarbon reaction mixture subsequent to contacting the unquenched polybutadiene with said titanium tetrachloride and said molecular oxygen.

6. A process according to claim 5 wherein the titanium tetrachloride is present in the range of from about 0.05 to about 1.5 parts by weight per 100 parts by weight of polymer and the molecular oxygen is introduced in the range from about 0.1 to about 20 millimoles per 100 parts by weight of polymer.

7. A process according to claim 6 wherein the temperature of said liquid hydrocarbon is in the range of from 50°–200° F.

8. A process according to claim 7 wherein the titanium tetrachloride is in contact with the polybutadiene for at least 15 minutes before the molecular oxygen is introduced and wherein the shortstopping agent is not added until at least 2 minutes after said introduction of the molecular oxygen.

9. A process according to claim 8 wherein a polybutadiene stabilizing agent is added along with the shortstopping agent.

10. A process according to claim 9 wherein the shortstopping agent is a disproportionated rosin and the stabilizing agent is 2,2'-methylene bis(4-methyl-6-tert-butylphenol).

11. A process according to claim 10 wherein the molecular oxygen is introduced as air.

12. A process according to claim 11 wherein at least 85 percent of the butadiene units are in the 1,4 configuration.

13. A process according to claim 13 wherein the liquid hydrocarbon is toluene.

14. A process according to claim 13 wherein the titanium tetrachloride is present in an amount of 0.56 parts by weight per 100 parts by weight of polymer and the molecular oxygen is present in an amount of 1.8 millimoles per 100 parts by weight of polymer.

* * * * *

UNITED STATES PATENT OFFICE

CERTIFICATE OF CORRECTION

Patent No. 3,668,162                            Dated:    June 6, 1972

Mason S. Wilt

It is certified that error appears in the above-identified patent and that said Letters Patent are hereby corrected as shown below:

Column 6, line 6, delete the numeral "13" and insert therefor the numeral -- 12 --.

Signed and sealed this 17th day of October 1972.

(SEAL)
Attest:

EDWARD M. FLETCHER, JR.                  ROBERT GOTTSCHALK
Attesting Officer                            Commissioner of Patents